(12) United States Patent
Lim et al.

(10) Patent No.: US 9,826,459 B2
(45) Date of Patent: Nov. 21, 2017

(54) METHOD AND APPARATUS FOR FORWARDING SIGNAL FOR WIRELESS MULTI-HOP COMMUNICATION

(71) Applicant: Samsung Electronics Co., Ltd., Gyeonggi-do (KR)

(72) Inventors: Sung-Hoon Lim, Gyeonggi-do (KR); Kwang-Taik Kim, Gyeonggi-do (KR); Young-Han Kim, La Jolla, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 14/599,318

(22) Filed: Jan. 16, 2015

(65) Prior Publication Data

US 2015/0201366 A1    Jul. 16, 2015

(30) Foreign Application Priority Data

Jan. 16, 2014    (KR) ........................ 10-2014-0005359

(51) Int. Cl.
*H04W 4/00*    (2009.01)
*H04W 40/22*    (2009.01)
*H04L 1/00*    (2006.01)
*H04B 7/15*    (2006.01)

(52) U.S. Cl.
CPC .......... *H04W 40/22* (2013.01); *H04L 1/0045* (2013.01); *H04L 1/0076* (2013.01); *H04B 7/15* (2013.01); *H04L 2001/0097* (2013.01)

(58) Field of Classification Search
CPC .... H04W 40/22; H04L 1/0045; H04L 1/0076; H04L 2001/0097; H04B 7/15

USPC ................. 370/338, 328–334; 455/421–423, 455/445–449
See application file for complete search history.

(56) References Cited

U.S. PATENT DOCUMENTS

| | | | |
|---|---|---|---|
| RE45,125 E * | 9/2014 | Imai ................... | H04B 7/15557 455/11.1 |
| 2003/0125067 A1* | 7/2003 | Takeda ................ | H04W 52/247 455/522 |
| 2011/0158295 A1* | 6/2011 | Shiizaki ................ | H04B 7/155 375/211 |

(Continued)

OTHER PUBLICATIONS

Frank R. Kschishang, et al., "Factor Graphs and the Sum-Product Algorithm", IEEE Transactions on Information Theory, vol. 47, No. 2, Feb. 2001, pp. 498-519.

*Primary Examiner* — Thai Hoang

(57) ABSTRACT

A wireless multi-hop network includes a source node, at least one relay node, and a destination node. Each relay node is configured to perform partial decoding on a received signal including at least one previous-hop transmission signal according to a predefined function to calculate a function signal for the at least one previous-hop transmission signal, and encode the function signal and transmit the encoded function signal to a next hop. A destination node includes a receiver configured to obtain a received signal comprising a combination of a plurality of transmission signals for transmission by a source node and to be relayed by at least one relay node, and a decoder configured to configure a decoder graph corresponding to channel coding by the source node and relay nodes and to joint-decode the received signal according to the decoder graph to detect information blocks from the received signal.

16 Claims, 11 Drawing Sheets

(56) References Cited

U.S. PATENT DOCUMENTS

| | | | | |
|---|---|---|---|---|
| 2012/0239997 A1* | 9/2012 | Otsuki | ............... | H04B 7/15521 714/746 |
| 2013/0064169 A1* | 3/2013 | Song | ...................... | H04B 7/155 370/315 |
| 2013/0336202 A1* | 12/2013 | Oh | ........................ | H04B 7/155 370/315 |

* cited by examiner

METHOD AND APPARATUS FOR FORWARDING SIGNAL FOR WIRELESS MULTI-HOP COMMUNICATION

CROSS-REFERENCE TO RELATED APPLICATION AND CLAIM OF PRIORITY

The present application is related to and claims priority under 35 U.S.C. §119(a) to Korean Patent Application Serial number 10-2014-0005359, which was filed on Jan. 16, 2014 in the Korean Intellectual Property Office, the entire disclosure of which is hereby incorporated by reference.

TECHNICAL FIELD

Various embodiments of the present disclosure relate to a method and apparatus for forwarding a signal of a physical layer to enable efficient transmission in a wireless multi-hop network.

BACKGROUND

Wireless communication systems divide the entire coverage into a plurality of cells and cover the cells through Node Bs or Base Stations (BSs), respectively, to support uninterrupted continuous communication service for Mobile Stations (MSs) or User Equipment (UE), moving between cells. An improved wireless communication system increases a cell density by using small-cell BSs serving as relay nodes between a BS and an MS, thereby increasing transmission capacity, solving a shadow area problem, and achieving offloading. In this system, it may be cost-inefficient to connect the respective small-cell BSs in a wired manner, such that it is highly likely that the small-cell BSs may be configured as a small-cell network through a wireless backhaul. In the wireless backhaul network, multi-hop transmission is performed from an existing BS connected to a wired network, that is, a macro BS, to an MS through one or more small-cell BSs in a wireless manner.

In a multi-hop network, the core technology is to find out how each relay node forwards a received signal to the next hop. Amplify-Forward (AF), Decode-Forward (DF), and Compress-Forward (CF) are existing schemes for processing received signals at relay nodes. However, these schemes show the best performance only for a particular network topology (for example, three nodes) and a particular channel gain, failing to show stable performance in a structure where connection between a macro BS and an MS varies at any time, such as in a wireless multi-hop network.

For example, in case of DF, decoding is performed in each link, such that after a received signal is decoded in each hop by using an existing single hop channel code, the received signal is encoded using the single hop channel code in the next hop. However, it is known that transmission performed optimally for each link operates very inefficiently, and signal transmission is needed to enable joint decoding on the overall network.

In other words, there exists a need for a multi-hop transmission technique which is applicable to various networks, including existing network coding, based on an arbitrary network topology and a general framework for a channel gain, and is capable of achieving proper performance regardless of a channel gain and a network topology.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for forwarding a signal in a multi-hop network.

Various aspects of the present disclosure also provide a multi-hop transmission technique for an arbitrary network topology and a channel gain.

Various aspects of the present disclosure also provide a signal forwarding method and apparatus which is applicable to various network structures.

Various aspects of the present disclosure also provide a channel encoding and decoding method and apparatus for each hop of a multi-hop network.

Various aspects of the present disclosure also provide a method and apparatus for achieving a system capacity required in a next-generation communication system including wireless relay nodes.

Other objects to be provided in the present disclosure may be understood by embodiments described below.

According to an aspect of the present disclosure, there is provided a method for forwarding a signal for wireless multi-hop communication, the method including performing partial decoding with respect to a received signal comprising at least one previous-hop transmission signal according to a predefined function to calculate a function signal for the at least one previous-hop transmission signal and encoding the function signal to for transmission to a next hop.

According to another aspect of the present disclosure, there is provided a method for receiving a signal for wireless multi-hop communication, the method including obtaining a received signal in which a plurality of transmission signals to be transmitted by a source node and to be relayed by at least one relay node are combined, configuring a decoder graph corresponding to channel coding by the source node and the at least one relay node, and joint-decoding the received signal according to the decoder graph to detect information blocks transmitted from the source node from the received signal.

According to another aspect of the present disclosure, there is provided a relay node apparatus for forwarding a signal for wireless multi-hop communication, the relay node apparatus including a decoder configured to perform partial decoding with respect to a received signal comprising at least one previous-hop transmission signal according to a predefined function to calculate a function signal for the at least one previous-hop transmission signal, and a channel encoder configured to encode the function signal and to transmit the encoded function signal to a next hop.

According to another aspect of the present disclosure, there is provided a destination node apparatus for receiving a signal for wireless multi-hop communication, the destination node apparatus including a receiver configured to obtain a received signal in which a plurality of transmission signals to be transmitted by a source node and to be relayed by at least one relay node are combined and a decoder configured to configure a decoder graph corresponding to channel coding by the source node and the at least one relay node and to joint-decode the received signal according to the decoder graph to detect information blocks transmitted from the source node from the received signal.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
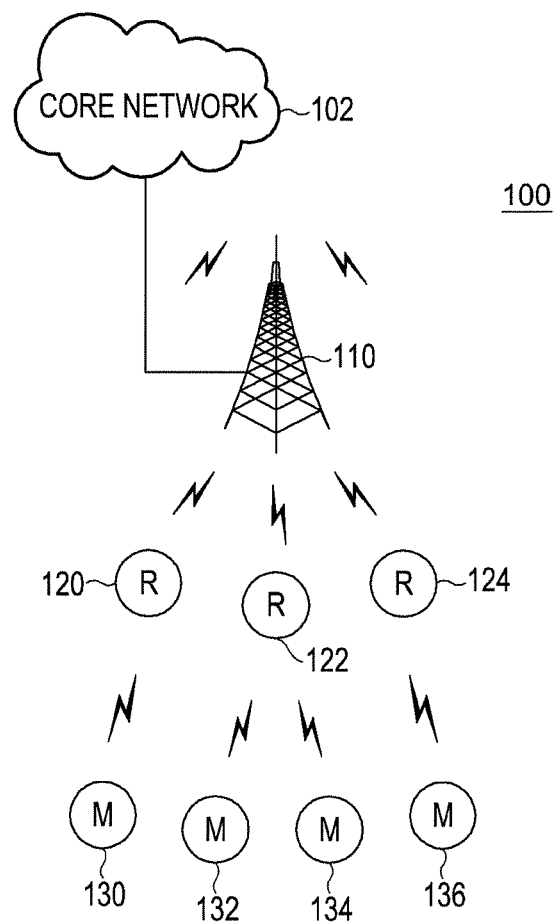
FIG. 1 illustrates a structure of a wireless multi-hop network according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure will be described herein below with reference to the accompanying drawings. For the purposes of clarity and simplicity, detailed descriptions of well-known functions or configurations will be omitted as they would unnecessarily obscure the subject matters of the present disclosure. Also, the terms used herein are defined according to the functions of the present disclosure. Thus, the teens may vary depending on users' or operators' intentions or practices. Therefore, the terms used herein should be understood based on the descriptions made herein.

Although the present disclosure can be modified variously and have several embodiments, specific example embodiments are illustrated in the accompanying drawings and will be mainly described in the specification. However, the scope of the present disclosure is not limited to the specific embodiments and should be construed as including all the changes, equivalents, and substitutions included in the spirit and scope of the present disclosure.

Singular expressions such as "unless explicitly indicated otherwise" or "the" may be understood as including plural expressions. For example, "component surface" may include one or more component surfaces.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

Terms used in various embodiments of the present disclosure are intended to describe an exemplary embodiment, rather than to limit the various embodiments of the present disclosure. As used herein, the singular forms are intended to include the plural forms as well, unless the context clearly indicates otherwise. Terms "include" or "may include" used in various embodiments of the present disclosure indicate an existence of disclosed function, operation, or element, but do not limit an existence of one or more other functions, operations, or elements. Terms "include" or "has" used in the present disclosure should be understood that they are intended to indicate an existence of feature, number, step, operation, element, item or any combination thereof, disclosed in the specification, but should not be understood that they are intended to previously exclude an existence of one or more other features, numbers, steps, operations, elements, or any combination thereof or possibility of adding those things.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

FIG. 1 illustrates a structure of a wireless multi-hop network according to an embodiment of the present disclosure.

Referring to FIG. 1, a wireless multi-hop network 100 can include a macro Base Station (BS) 100 connected with a core network 102 in a wired manner, a plurality of Mobile Stations (MSs) 130, 132, 134, and 136 provided with a communication service through the macro BS 100, and at least one of small-cell BSs 120, 122, and 124 that can form a wireless communication link between the macro BS 100 and the MSs 130, 132, 134, and 136. The small-cell BSs 120, 122, and 124 operate as relay nodes between the macro BS 100 and the MSs 130, 132, 134, and 136 to form a wireless backhaul network. On the communication link between the macro BS 100 and the MSs 130, 132, 134, and 136, one or more small-cell BSs 120, 122, and 124 can exist.

In downlink transmission, the macro BS 100 serves as a source node, the small-cell BSs 120, 122, and 124 serve as relay nodes, and the MSs 130, 132, 134, and 136 serve as destination nodes.

A source node encodes a transmission signal, and a relay node decodes a received signal and encodes a transmission signal. A destination node decodes a received signal to detect a transmission signal to be transmitted by the source node. Each relay node receives a signal transmitted from at least one previous hop (the source node or another relay node), and generates a signal to be transmitted in the next hop based on the received signal. To this end, each relay node uses a Distributed Decode Forward (DDF) scheme which is a channel coding scheme for enabling joint decoding in the next hop.

DDF includes network transformation coding. That is, DDF assumes the original network to be another 'virtual' network on which encoding and decoding are performed. Through this process, outputs of network nodes are converted, that is, decoded, into predefined outputs, such that the outputs of the network nodes are predictable and the source node treats the original network as a deterministic network.

Figures 2A, 2B:
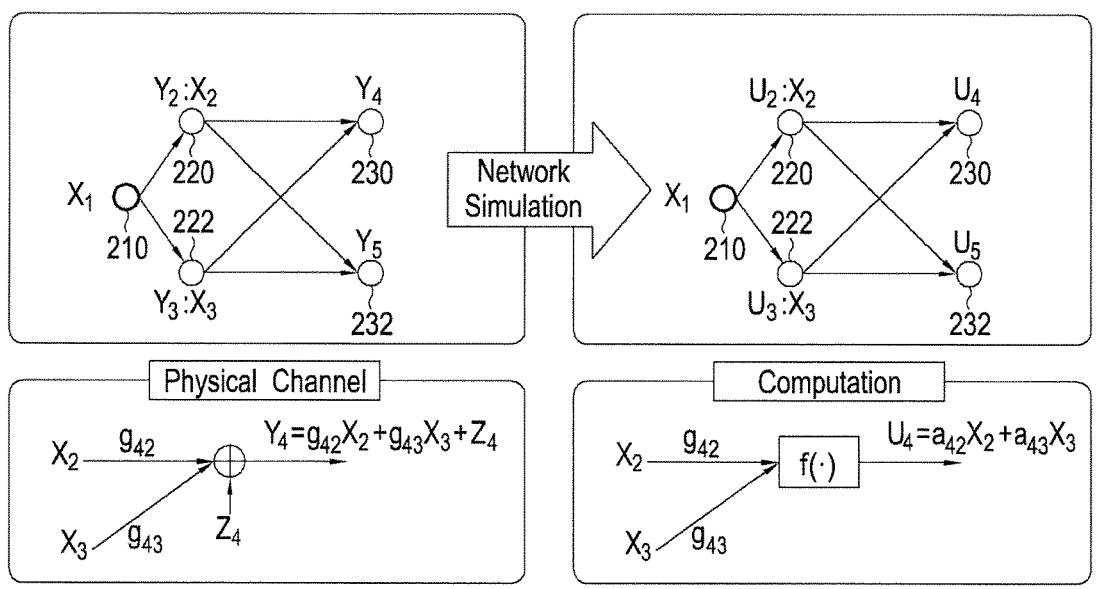
FIGS. 2A and 2B schematically illustrate signal flows of Distributed Decode Forward (DDF) according to an embodiment of the present disclosure.

FIGS. 2A and 2B schematically illustrate a signal flow of DDF according to an embodiment of the present disclosure.

FIG. 2A shows a 'real' wireless network which is transformed into a 'virtual' network through network simulation as illustrated in FIG. 2B.

In the real wireless network illustrated in FIG. 2A, Node 1 operates as a source node 210 that transmits a transmission signal $X_1$. A signal received from the source node 210 by Node 2 operating as a first relay node 220 is represented by $Y_2$, and a transmission signal from the first relay node 220 is represented by $X_2$. A signal received from the source node 210 by Node 3 operating as a second relay node 222 is represented by $Y_3$, and a transmission signal from the second relay node 222 is represented by $X_3$. A signal $Y_4$ received by Node 4 operating as a first destination node 230 includes the transmission signal $X_2$ of the first relay node 220 and the transmission signal $X_3$ of the second relay node 222. Likewise, a received signal $Y_5$ of Node 5 operating as a second destination node 232 includes the transmission signal $X_2$ of the first relay node 220 and the transmission signal $X_3$ of the second relay node 222.

In the real wireless network, the received signal $Y_4$ of the first destination node 230 can be expressed as follows:

$$Y_4 = g_{42}X_2 + g_{43}X_3 + Z_4,$$

where $g_{42}$ represents a real channel gain from the first relay node 220 to the first destination node 230, $g_{43}$ represents a real channel gain from the second relay node 222 to the first destination node 230, and $Z_4$ represents noise and interference introduced to the first destination node 230.

In the virtual network illustrated in FIG. 2B, the source node 210 transmits the transmission signal $X_1$. A signal received by the first relay node 220 from the source node 210 is represented by $U_2$ and the transmission signal from the first relay node 220 is represented by $X_2$. A signal received by the second relay node 222 from the source node 210 is represented by $U_3$ and the transmission signal from the second relay node 222 is represented by $X_3$. A signal $U_4$ received by the first destination node 230 includes the transmission signal $X_2$ of the first relay node 220 and the transmission signal $X_3$ of the second relay node 222. A signal $U_5$ received by the second destination node 232 also includes the transmission signal $X_2$ of the first relay node 220 and the transmission signal $X_3$ of the second relay node 222.

In the virtual network, the received signal $U_4$ of the first destination node 230 can be expressed as follows:

$$U_4 = a_{42}X_2 + a_{43}X_3,$$

where $a_{42}$ represents a channel gain from the first relay node 220 to the first destination node 230 in the virtual network, and $a_{43}$ represents a channel gain from the second relay node 222 to the first destination node 230 in the virtual network.

Figure 3A:
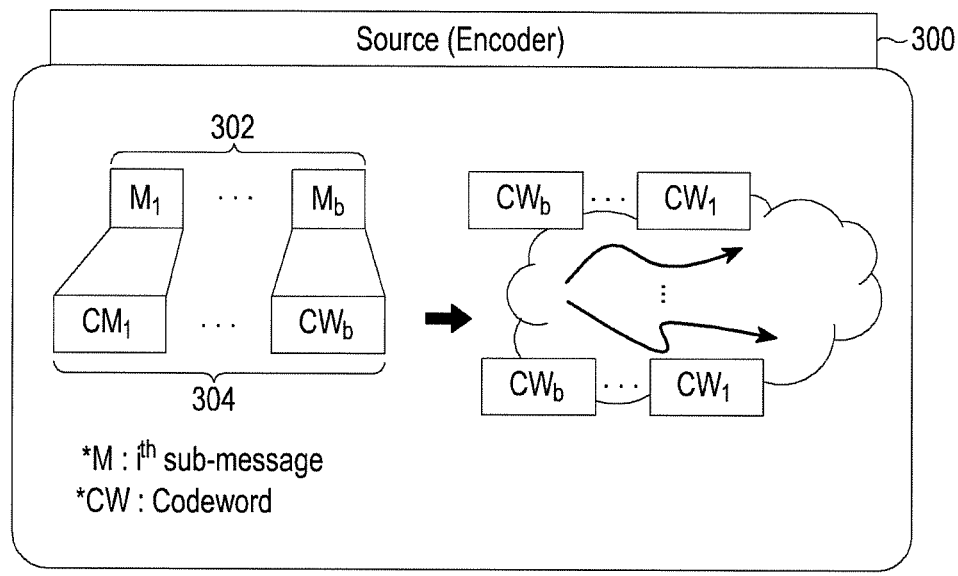
FIGS. 3A through 3C illustrate signal conversion performed in each network node of a multi-hop network according to an embodiment of the present disclosure.
Figure 3B:
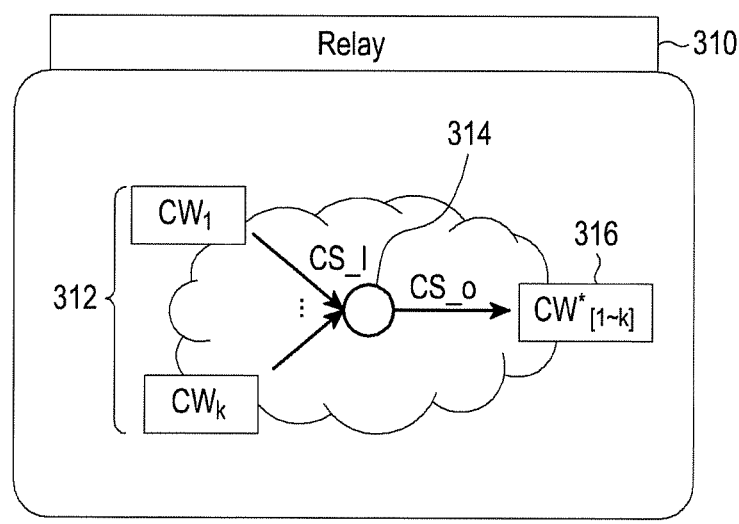
Figure 3C:
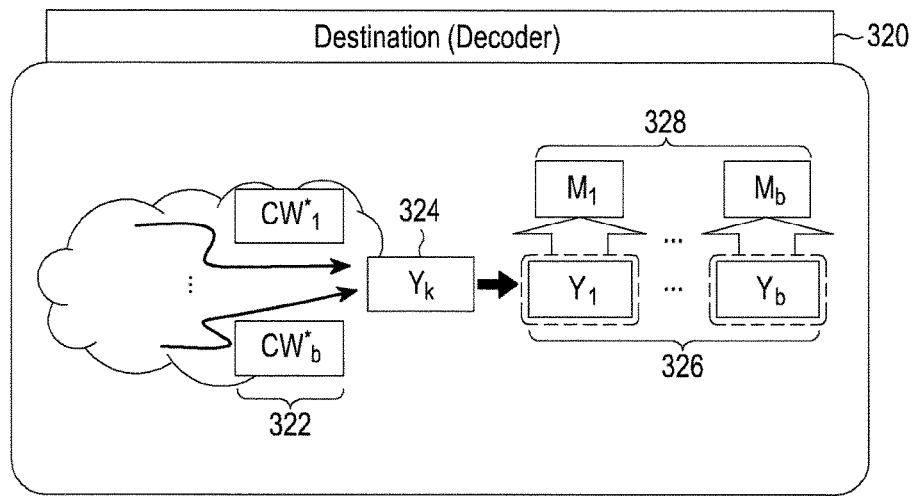

FIGS. 3A through 3C illustrate signal conversion performed in each network node of a multi-hop network according to an embodiment of the present disclosure.

FIG. 3A illustrates channel encoding performed by a source node 300. The source node 300 channel-encodes sub messages $M_1, \ldots, M_b$ of a predetermined-length bitstream (information block) by using independent codebooks to generate b codewords $CW_1, \ldots, CW_b$. Codewords for each information block are modulated into predetermined-length modulation blocks and are transmitted wirelessly.

FIG. 3B illustrates function decoding and channel encoding performed by a relay node 310. K codewords $CW_1, \ldots, CW_k$ from at least one previous hop (the source node 300 or another relay node) are input to the relay node 310 through an input channel CS_I (Input Channel State), and k new codewords $CW^*_{[1 \sim k]}$ generated by the relay node 310 are output through an output channel CS_O (Output Channel State). A decoder of the relay node 310 detects a function signal including transmission signals from previous hops, through partial decoding, instead of full decoding that detects the transmission signals from the previous hops. The function signal is calculated by a predefined function for increasing the overall network transmission capacity according to a network condition. The function signal is output from the relay node 310 through channel encoding according to a predefined scheme.

FIG. 3C illustrates joint decoding performed by a destination node 320. The destination node 320 demodulates signals received from at least one previous hop (the source node 300 or the relay node 310) to obtain a received signal $Y_k$ where b codewords $CW^*_1, \ldots, CW^*_b$ are combined. A joint decoder of the destination node 320 performs joint decoding with respect to the received signal $Y_k$ to detect b sub messages corresponding to b received-signal components $Y_1, \ldots, Y_b$ of the received signal.

A multi-hop network according to an embodiment of the present disclosure is roughly divided into three parts, that is, a transmission unit, a relay unit, and a reception unit, and the three parts comprehensively operate to implement a DDF channel code. The reception unit performs joint decoding that considers channel coding by the three parts. The relay unit performs partial decoding. In other words, full decoding is performed in the reception unit, and in the relay unit, partial decoding is performed.

Figure 4:
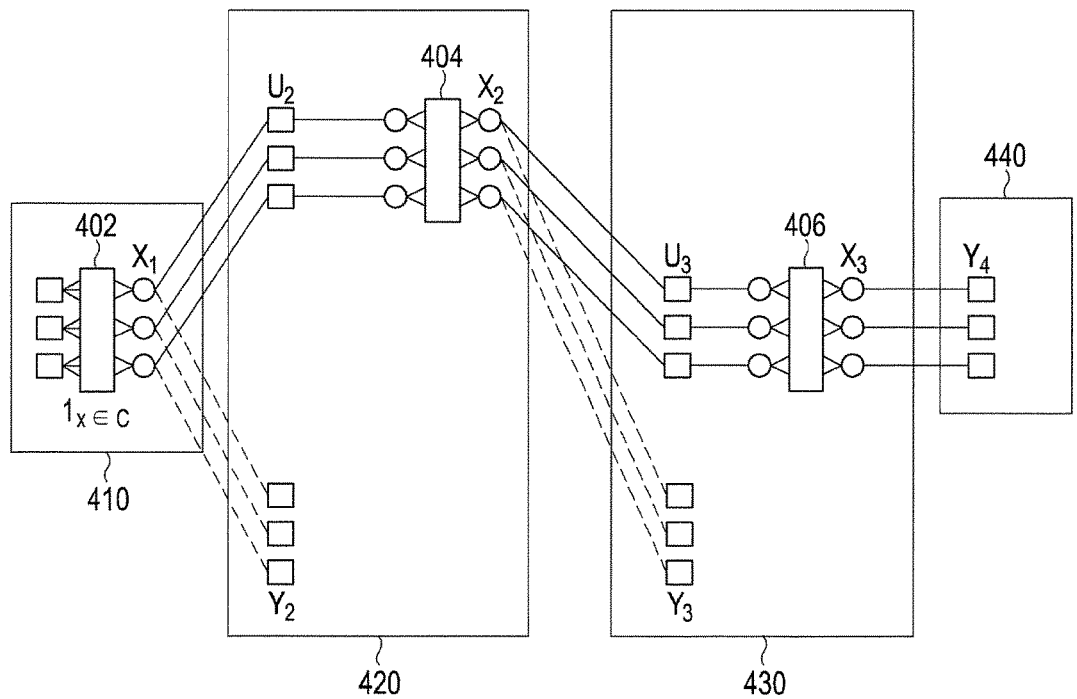
FIG. 4 illustrates signal forwarding of a multi-hop network according to an embodiment of the present disclosure.

FIG. 4 illustrates signal forwarding of a multi-hop network according to an embodiment of the present disclosure, showing a graphic network that means a graphic model of the multi-hop network through which a single received by a destination node 440 passes.

Referring to FIG. 4, a source node 410 implemented with Node 1 generates and transmits a transmission signal $X_1$ by using a given channel code 402. A first relay node 420 implemented with Node 2 generates a function signal $U_2$ including the transmission signal $X_1$ based on a received signal $Y_2$, encodes the function signal $U_2$ by using a given channel code 404 to generate the transmission signal $X_2$, and transmits the generated transmission signal $X_2$ in the air. A second relay node 430 implemented with Node 3 generates a function signal $U_3$ including the transmission signal $X_2$ based on a received signal $Y_3$, encodes the function signal $U_3$ by using a given channel code 406 to generate a transmission signal $X_3$, and transmits the generated transmission signal $X_3$ in the air.

The destination node 440 backtracks a route of a signal flow formed by the second relay node 430, the first relay node 420, and the source node 410 based on a received signal $Y_4$, thereby reconstructing the transmission signal $X_1$ generated by the source node 410.

First, a description will be made of operations of a source node in a real multi-hop network.

Figure 5:
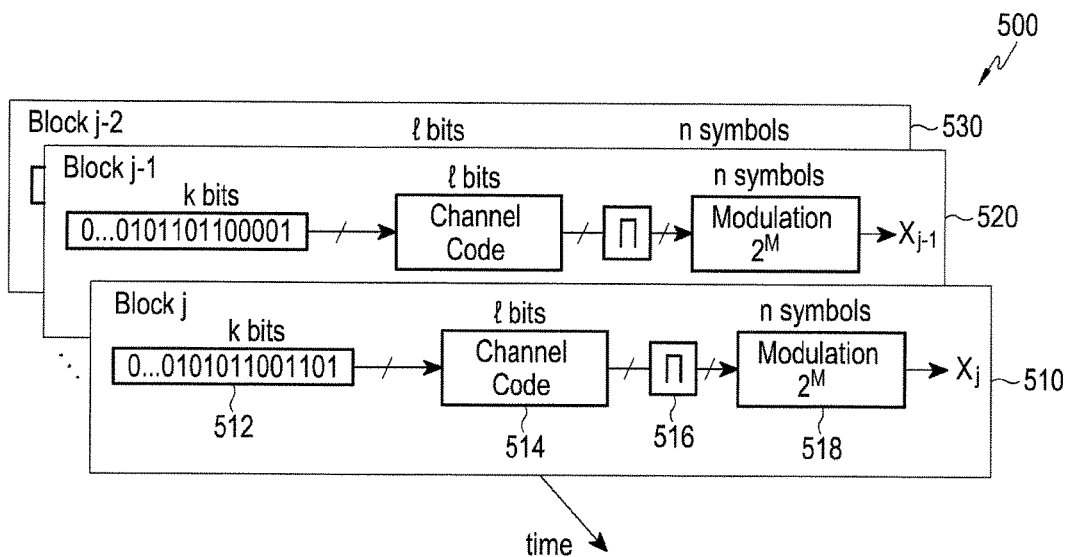
FIG. 5 is a block diagram illustrating a structure of a source node (or transmission node) in a multi-hop network according to an embodiment of the present disclosure.

FIG. 5 is a block diagram illustrating a structure of a source node in a multi-hop network according to an embodiment of the present disclosure.

Referring to FIG. 5, a source node 500 can include encoding blocks 510, 520, and 530 having a pipeline structure to encode input k-bit information blocks block-by-block, operating in time order. The encoding block 510 receives input of a k-bit bitstream 512, and a channel encoder 514 operating using a given channel code generates an l-bit codeword based on the bitstream 512. The channel code can be a channel code capable of using a decoding scheme for maximizing an iterative maximum a priori probability, such as a Low Density Parity Check (LDPC) code, a turbo code, a Repeat Accumulate (RA) code, a Low Density Generator Matrix (LDGM) code, or the like.

For Bit Interleaved Modulation (BICM), an interleaver 516 can be selectively included at the rear of the channel encoder 514. A modulator 518 maps the codeword from the channel encoder 514 or bits of the interleaved codeword to n modulation symbols according to a given modulation order M for transmission. A transmission signal output from the $j^{th}$ encoding block 510 of the source node 500 is represented by $X_j$.

Next, a description will be made of operations of a relay node in a multi-hop network.

Figure 6:
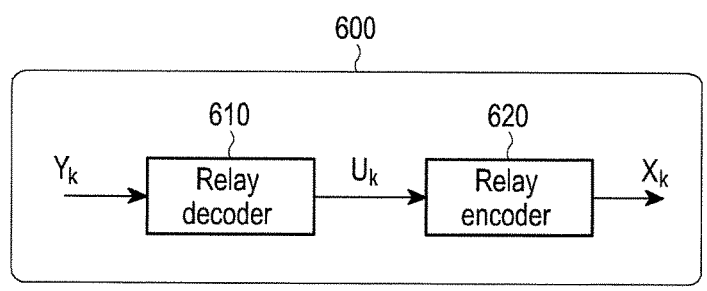
FIG. 6 is a block diagram illustrating a structure of a relay node in a multi-hop network according to an embodiment of the present disclosure.

FIG. 6 is a block diagram illustrating a structure of a relay node in a multi-hop network according to an embodiment of the present disclosure.

Referring to FIG. 6, Node k operating as a relay node 600 can include a decoder 610 for performing partial decoding based on a received signal $Y_k$ to generate a function signal $U_k$ including transmission signals of previous hops and an encoder 620 for encoding the function signal $U_k$ by using a given channel code to generate a transmission signal $X_k$.

Figure 7:
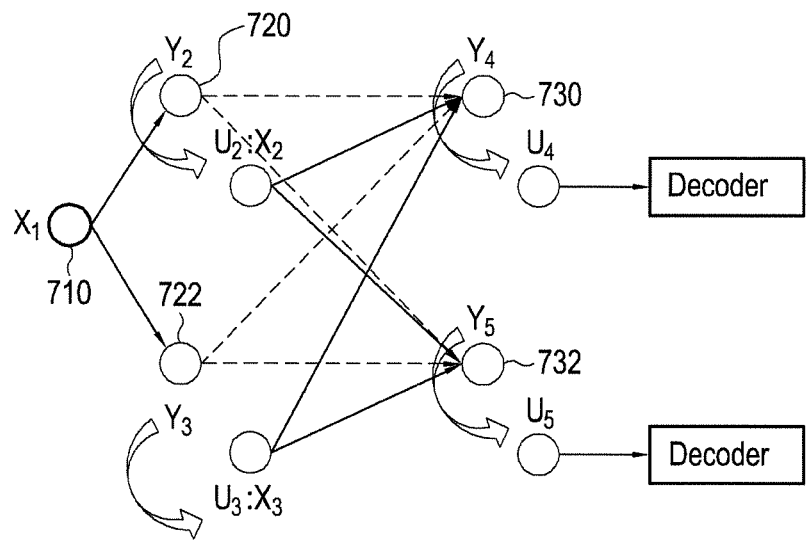
FIG. 7 is a diagram for describing computation decoding in a relay node according to an embodiment of the present disclosure.

As stated above, in each relay node 600, the decoder 610 reconstructs a function signal including transmission signals of previous hops, instead of directly reconstructing the transmission signals of the previous hops. The function signal is defined as a function improving the overall transmission capacity of a network based on a network condition. In an embodiment, an optimal function suitable for each system is predefined according to a system operator or communication standards, and a relay node can perform encoding and decoding according to the predefined function. Herein, such decoding will be referred to as computation decoding. FIG. 7 is a diagram for describing computation decoding in a relay node according to an embodiment of the present disclosure.

Referring to FIG. 7, a transmission signal $X_1$ from a source node 710 is received by a relay node 720 in the form of a received signal $Y_2$, after passing through a channel. The relay node 720 implemented with Node 2 generates a function signal $U_2$, instead of reconstructing the transmission signal $X_1$ from the received signal $Y_2$, and channel-encodes the function signal $U_2$ to output a transmission signal $X_2$. Likewise, a relay node 722 implemented with Node 3 generates a function signal $U_3$ based on a received signal $Y_3$, and channel-encodes the function signal $U_3$ to output a transmission signal $X_3$. Node 4 730, which is the next hop of Node 2 and Node 3, also generates a function signal $U_4$ through partial decoding from a received signal $Y_4$, and Node 5 732, which is the next hop of Node 2 and Node 3, also generates a function signal $U_5$ through partial decoding from a received signal $Y_5$.

Figure 8:
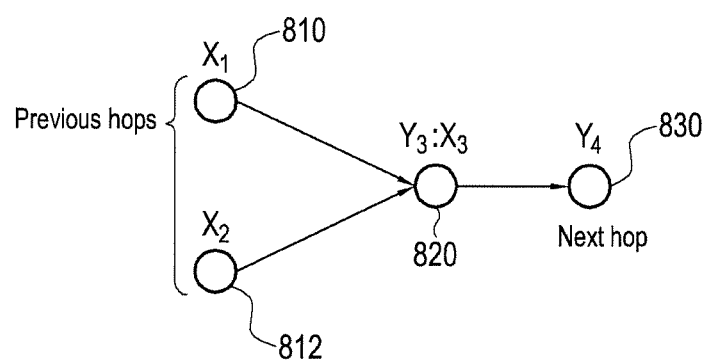
FIG. 8 illustrates a structure of a physical network including a relay node according to an embodiment of the present disclosure.

FIG. 8 illustrates a structure of a physical network including a relay node according to an embodiment of the present disclosure. As is shown, previous hops of Node 3 820 operating as a relay node are Node 1 810 and Node 2 812, and Node 3 820 is connected to the next hop, Node 4 830. Thus, a received signal $Y_3$ of Node 3 820 includes a transmission signal $X_1$ of Node 1 810 and a transmission signal $X_2$ of Node 2 812, and a transmission signal $X_3$ of Node 3 820 is generated based on the received signal $Y_3$ and then forwarded to Node 4 830.

A signal to be detected through channel decoding in Node 3 820 is a function signal $U_3 = f(X_1, X_2)$ of the transmission signals $X_1$ and $X_2$ of the previous hops. That is, instead of detecting the previous-hop transmission signals $X_1$ and $X_2$, Node 3 820 detects a function of the previous-hop transmission signals $X_1$ and $X_2$.

A function signal generated in each relay node is defined to maximize an overall performance or target data rate of a network. In an embodiment, the function signal is defined by quantization of a linear function of previous-hop transmission signals. For example, the function signal $U_3$ of Node 3 is defined as follows:

$$U_3 = [h_{31}X_1 + h_{32}X_2],$$

where $X_1$ and $X_2$ represent previous-hop transmission signals, $h_{ij}$ represents a channel coefficient (channel gain) of a link between Node i and Node j, and [.] represents a symbol that means quantization.

Figures 9A, 9B:
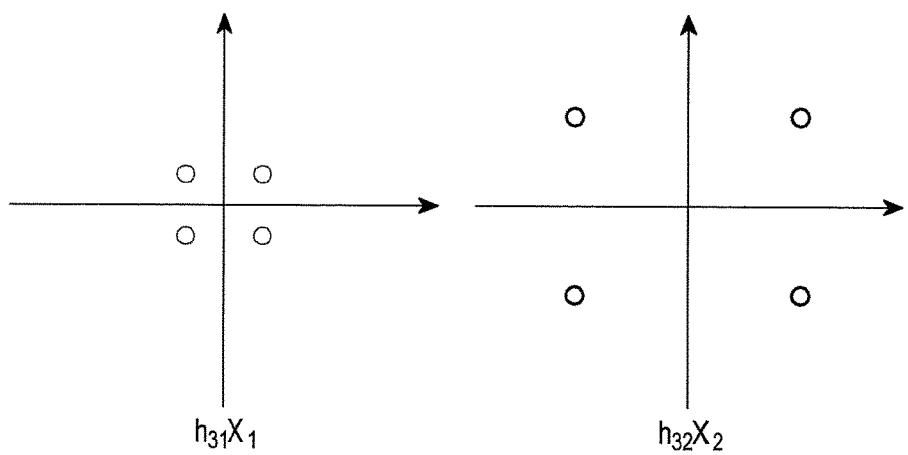
FIGS. 9A through 9C show constellation diagrams for describing a procedure for generating a function signal according to an embodiment of the present disclosure.
Figure 9C:
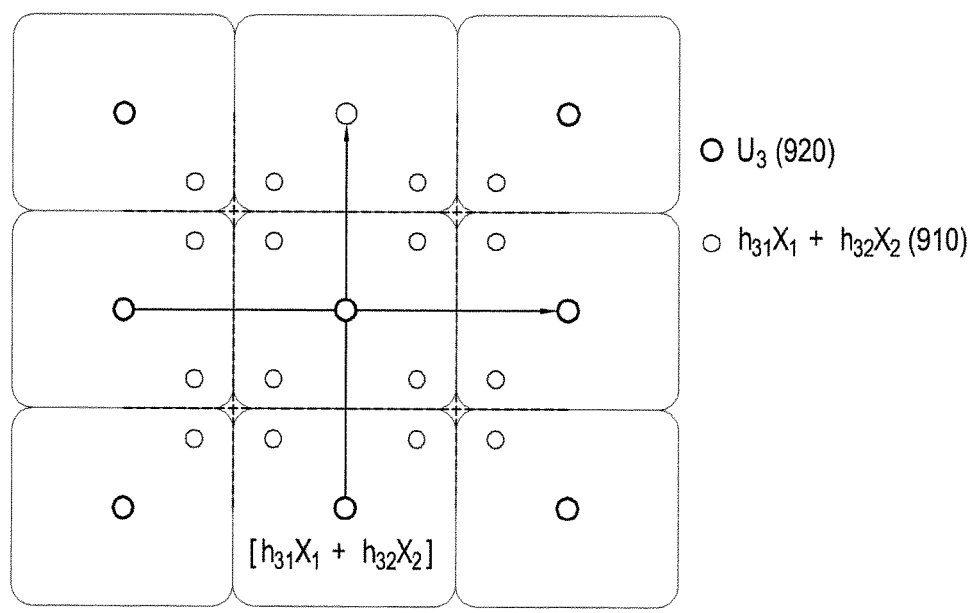

FIGS. 9A through 9C show a constellation for describing a procedure for generating a function signal according to an embodiment of the present disclosure.

FIG. 9A illustrates a set of signals $h_{31}X_1$ that can be derived from a transmission signal of Node 1, and FIG. 9B illustrates a set of signals $h_{32}X_2$ that can be derived from a transmission signal of Node 2. Linear combination of the both signals is represented by 910 in FIG. 9C, and a quantization result of the linear-combined signals, $U_3$, is mapped to one of 9 quantization regions 920 on the constellation. Herein, an example in which uniform quantization is used is shown, but Minimum Mean Square Error (MMSE) quantization can also be used in another embodiment.

In a relay node implemented with Node 3, an actually received signal is as follows:

$$Y_3 = h_{31}X_1 + h_{32}X_2 + Z_3,$$

where $h_{ij}$ represents a channel coefficient of a link between Node i and Node j, and $Z_3$ represents noise introduced to Node 3.

The relay node obtains a function signal $U_3$ having the highest probability based on the received signal $Y_3$ through a Maximum A Posteriori (MAP) decoding algorithm (for example, sum-product decoding).

Figure 10:
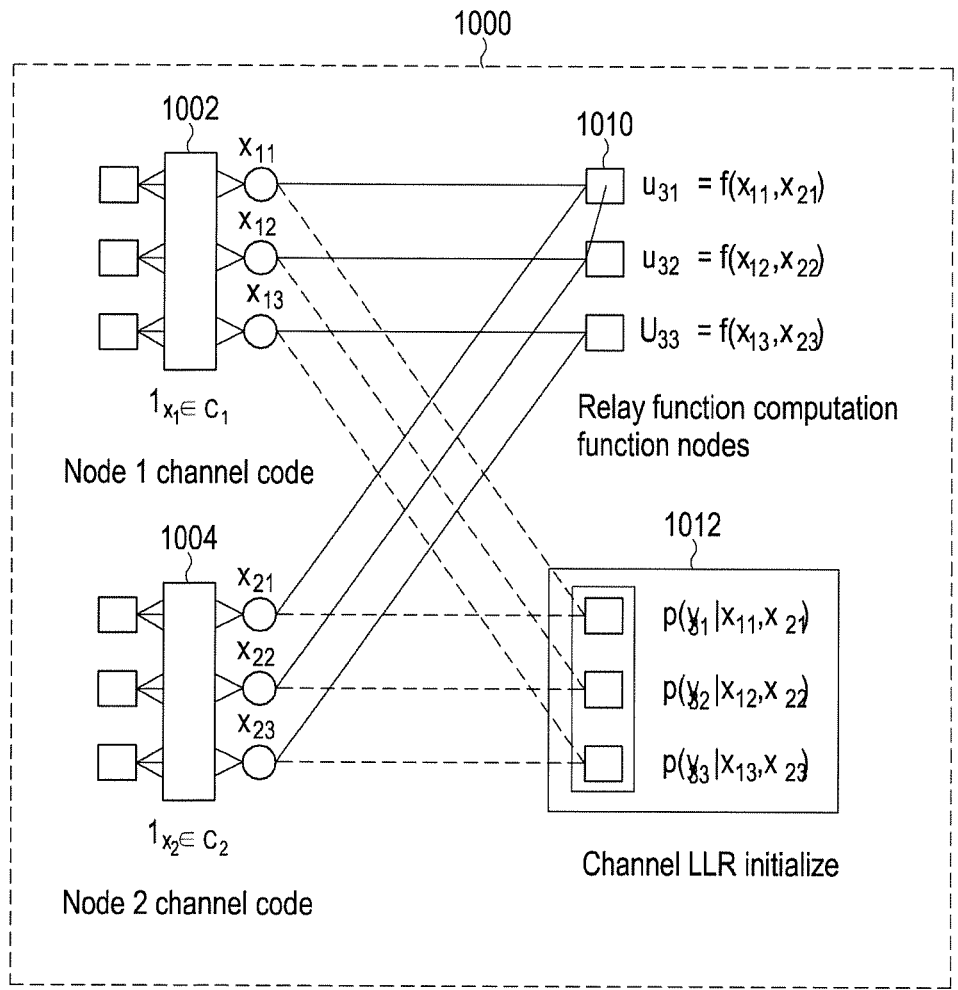
FIG. 10 is a decoder graph for obtaining a function signal in a relay node according to an embodiment of the present disclosure.

FIG. 10 is a decoder graph for obtaining a function signal in a relay node according to an embodiment of the present disclosure.

Referring to FIG. 10, a decoder graph 1000 can include variable nodes (or a variable node set) 1002 for Node 1 for storing Log Likelihood Ratio (LLR) values of a transmission signal for Node 1, variable nodes (or a variable node set) 1004 for Node 2 for storing LLR values of a transmission signal for Node 2, function nodes 1010 for calculating LLR values of a function signal, and observation nodes 1012 for updating LLR information of a received signal.

The variable nodes 1002 for Node 1 store LLR values of symbols of a codeword that can be a transmission signal of Node 1 according to a codebook $C_1$ used in Node 1, and the variable nodes 1004 for Node 2 store LLR values of symbols of a codeword that can be a transmission signal of Node 2 according to a codebook $C_2$ used in Node 2. The variable nodes 1002 for Node 1 are connected to the observation nodes 1012 and the function nodes 1010, and likewise, the variable nodes 1004 for Node 2 are connected to the observation nodes 1012 and the function nodes 1010.

A relay node decodes a function signal including transmission signals of previous hops by using the above-described decoder graph, as will be described in detail below.

The relay node calculates LLR values for symbols of a received signal $Y_3 = [y_{31}, y_{32}, y_{33}]$ by using the received signal $Y_3 = [y_{31}, y_{32}, y_{33}]$, stores the calculated LLR values in the observation nodes 1012 (LLR initialization), and performs joint-block-decoding based on the LLR values to detect bit LLR values for the transmission signal of Node 1 and bit LLR values for the transmission signal of Node 2. The bit LLR values for the transmission signal of Node 1 are stored in the variable node set 1002, and the bit LLR values for the transmission signal of Node 2 are stored in the variable node set 1004. Thus, the relay node updates, in the function nodes 1010, a function signal corresponding to information stored in the variable node sets 1002 and 1004. A function for generating the function signal can be defined as, for example, quantization of a linear function. The bit LLR values of the transmission signal stored in each of the variable node sets 1002 and 1004 are updated according to a relationship between symbols in a codeword according to a given channel code.

Thereafter, the observation nodes 1012 are updated based on the variable node sets 1002 and 1004, and the variable node sets 1002 and 1004 are calculated again according to the observation nodes 1012. The operation of updating the function nodes 1010 based on the variable node sets 1002 and 1004 can be iterated a given number of times or until a given iteration condition is satisfied.

Upon completion of iteration, the relay node performs hard-decision on the LLR values of the function signal stored in the function nodes 1010 to finally output a function signal including the hard-decided values.

The function signal output from a decoder of the relay node is channel-encoded using a given channel code and then transmitted to the next hop.

Figure 11:
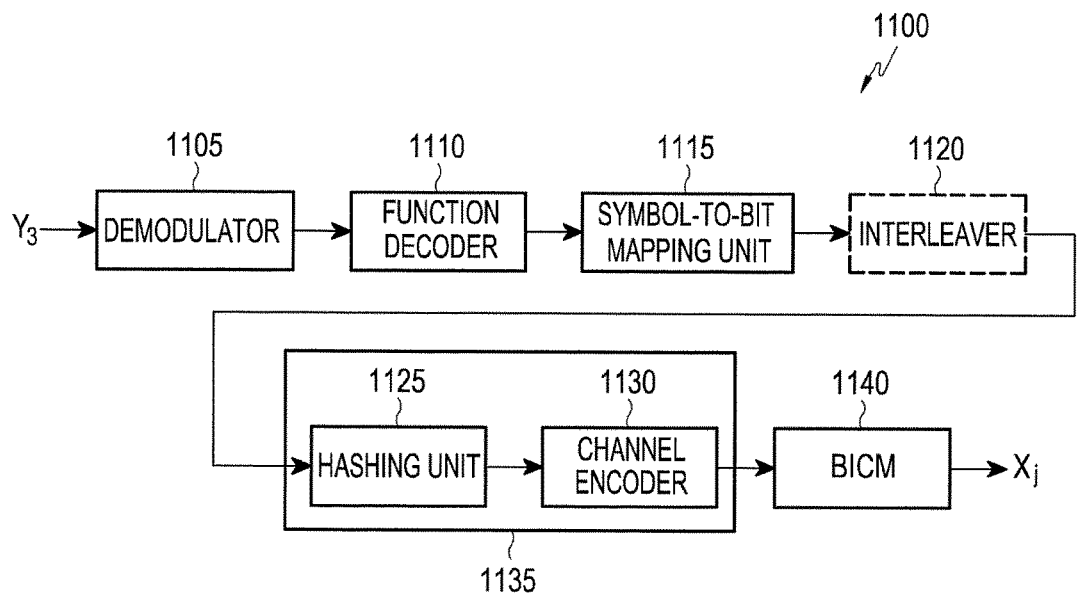
FIG. 11 is a block diagram illustrating the overall structure of a relay node according to an embodiment of the present disclosure.

FIG. 11 is a block diagram illustrating the entire structure of a relay node according to an embodiment of the present disclosure. As is shown, a relay node 1100 can include a demodulator 1105, a function decoder 1110, a symbol-to-bit mapping unit 1115, an interleaver 1120, a channel encoding unit 1135, and a Bit Interleaving Modulator (BICM) 1140.

Referring to FIG. 11, the demodulator 1105 demodulates a received signal Y to detect codewords transmitted from a previous hop. The function decoder 1110 detects a function signal U including transmission signals of previous hops based on the received signal, as mentioned before. The symbol-to-bit mapping unit 1115 maps symbols of the function signal to bits, respectively, according to a predetermined mapping rule. The interleaver 1120, which can be optionally provided, interleaves the bits from the symbol-to-bit mapping unit 1115 according to a predetermined interleaving rule.

The channel encoding unit 1135 can include a channel encoder 1130 that performs linear encoding with respect to the interleaved or mapped bits. A channel coding matrix can be an LDPC, an LDGM, a turbo code, or an RA code, as used in a source node. A hashing unit 1125 can be provided in front of the channel encoder 1130 to multiply the interleaved or mapped bits by a previously stored hashing matrix. The hashing unit 1125 is configured to apply the hashing matrix determined based on a required target data rate to an input. An encoded output from the channel encoding unit 1135 is modulated by the BICM 1140 and then transmitted as a transmission signal X in the air.

Operations of a destination node in a multi-hop network will be described.

The destination node configures a decoder graph that models a signal path from a source node to the destination node through at least one relay node, and tracks a reverse path of the signal path based on the decoder graph to reconstruct a transmission signal of the source node.

Figure 12:
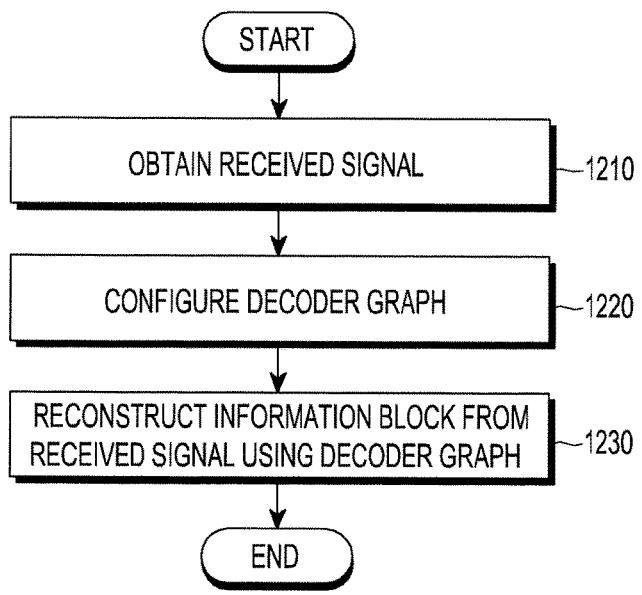
FIG. 12 is a flowchart illustrating operations of a destination node (or reception node) in a multi-hop network according to an embodiment of the present disclosure.

FIG. 12 is a flowchart illustrating operations of a destination node in a multi-hop network according to an embodiment of the present disclosure.

Referring to FIG. 12, in operation 1210, a destination node obtains a received signal coming through at least one previous hop. The received signal originates from a source node and arrives in the destination node through the at least one relay node. In operation 1220, the destination node configures a decoder graph for modeling a signal path through which the received signal passes. To this end, the destination node can receive, through the source node and/or the at least one relay node, signaling information for a channel code used in the source node and the at least one relay node through which the received signal passes. In operation 1230, the destination node detects information blocks transmitted by the source node, by performing joint decoding with respect to the received signal using the decoder graph.

Figure 13:
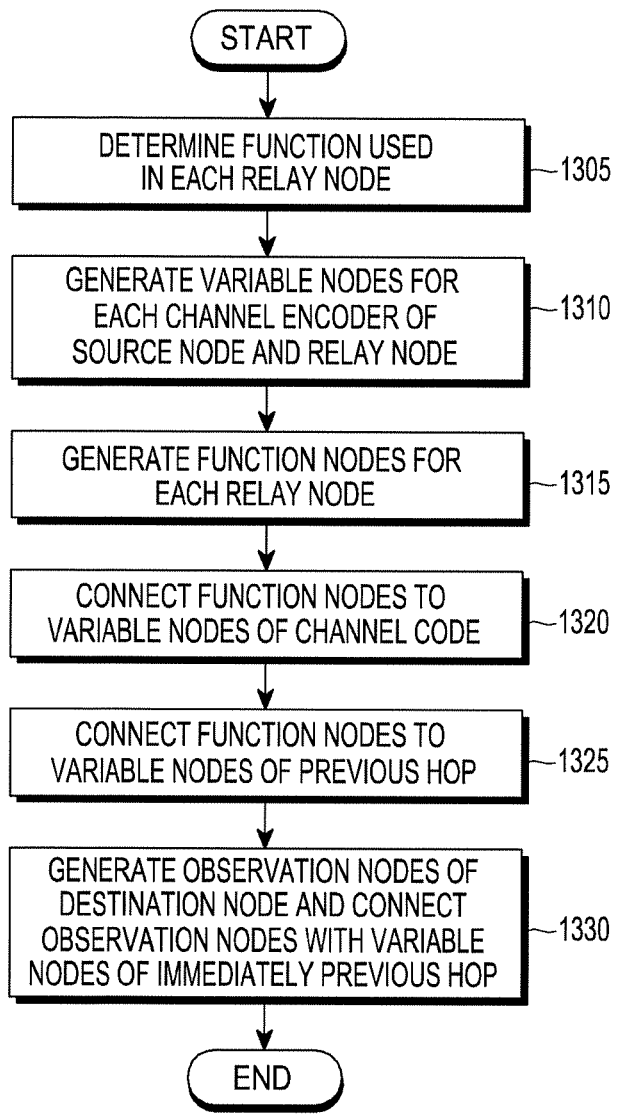
FIG. 13 is a flowchart illustrating a procedure for configuring a decoder graph in a destination node in a multi-hop network according to an embodiment of the present disclosure.

FIG. 13 is a flowchart illustrating a procedure for configuring a decoder graph in a destination node of a multi-hop network according to an embodiment of the present disclosure.

Referring to FIG. 13, in operation 1305, the destination node obtains information about a function used in each relay node through which the received signal passes, or in each relay node included in the multi-hop network. The information about the function can be stored in advance in the destination node or can be signaled to the destination node from the source node or at least one relay node. The destination node generates variable bodes for each channel encoder of the destination node and of each relay node in operation 1310, and generates function nodes for each relay node in operation 1315. The variable nodes are configured to calculate symbols of a transmission signal that can be generated by a channel encoder, and the function nodes are configured to calculate a function signal for symbols of the possible transmission signal.

The destination node connects the function nodes for each relay node with the variable nodes of a channel encoder in operation 1320, and connects the function nodes with the variable nodes of the previous hop in operation 1325. Thus, the function nodes are updated by symbols stored in the variable nodes of the previous hop, and stored values of the function nodes are reflected into the variable nodes of the channel encoder.

In operation 1330, the destination node generates observation nodes for storing a received signal of the destination node and connects the observation nodes to variable nodes for a channel encoder of a relay node corresponding to an immediately previous hop of the destination node. Thus, the decoder graph is configured to include the variable nodes, the function nodes, and the observation nodes.

In each graph, each function node is connected with variable node of a channel encoder, and variable codes corresponding to codeword of each transmission signal are connected with function nodes of the next hop. Each node is updated by another connected node. The procedure for forming the decoder graph can be performed variously according to the number of network nodes and a topology.

Figure 14:
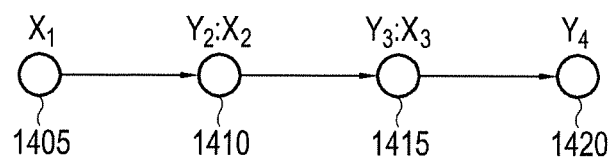
FIG. 14 illustrates a structure of a line network as an example of a multi-hop network according to an embodiment of the present disclosure.

FIG. 14 illustrates a structure of a line network as an example of a multi-hop network. As is shown, in a line network, a source node 1405 generates a transmission signal $X_1$ to output the generated transmission signal $X_1$ to the next hop, and a first relay node 1410 generates and outputs a transmission signal $X_2$ based on a received signal $Y_2$. A second relay node 1415 generates and outputs a transmission signal $X_3$ based on a received signal $Y_3$. A destination node 1420 detects the transmission signal $X_1$ of the source node 1405 based on a received signal $Y_4$.

Figure 15:
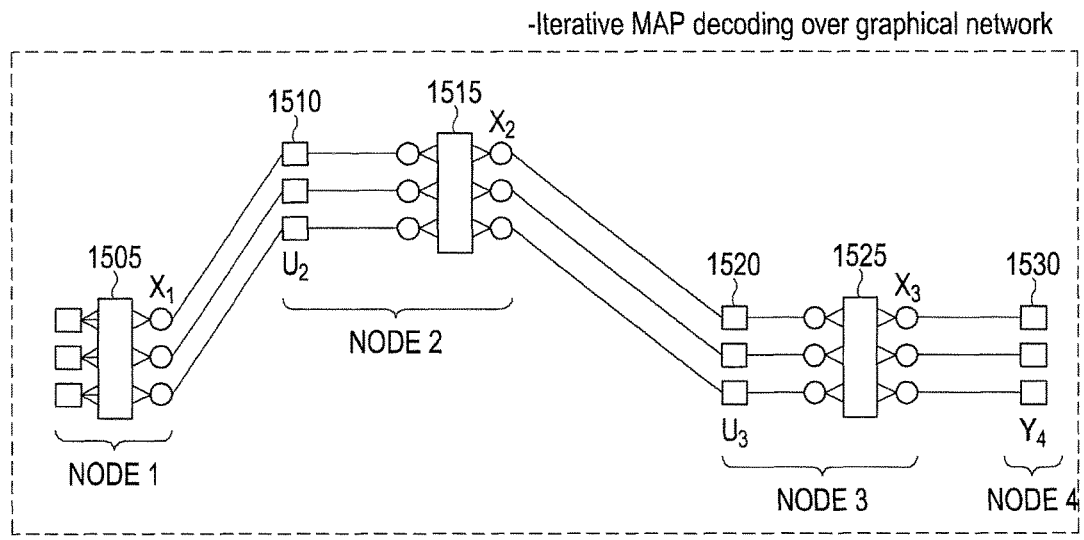
FIG. 15 is a decoder graph of a multi-hop decoder according to an embodiment of the present disclosure.

FIG. 15 is a decoder graph of a multi-hop decoder according to an embodiment of the present disclosure, in which a decoder graph for the line network illustrated in FIG. 14 is shown.

Referring to FIG. 15, variable nodes (or a variable node set) 1505 for a channel encoder used in the source node 1405 are generated, and variable node sets 1515 and 1525 for channel encoders used in the first relay node 1410 and the second relay node 1415 are generated. Next, function nodes 1510 and 1520 for use in calculation of a function signal in each relay node are generated. Thereafter, a destination node connects the function nodes 1510 for the first relay node 1410 with the variable node set 1515 of a corresponding channel encoder, and connects the function nodes 1520 for the second relay node 1415 with the variable node set 1525 of a corresponding channel encoder. The destination node connects the function nodes 1510 for the first relay node 1410 to the variable node set 1505 of the source node 1405, connects the function nodes 1520 for the second relay node 1415 to the variable node set 1515 of the first relay node 1410, and connects observation nodes 1530 for storing a received signal of the destination node to the variable node set 1525 of the second relay node 1415, thus completing a decoder graph.

Based on the decoder graph configured as described above, the destination node can use a symbol-by-symbol MAP algorithm such as a Sum Product Algorithm (SPA). Observation nodes and variable nodes in each channel encoder update and store LLR values according to a known decoding algorithm, and function nodes calculate and store LLR values of a function signal according to the updated LLR values of the variable nodes based on a predefined function, and pass the LLR values of the function signal to the variable nodes.

Decoding scheduling by the observation nodes and the variable nodes can be performed variously, and the destination node initially obtains LLR values from the received signal to initialize the observation nodes (that is, to store initial LLR values in the observation nodes) and performs message-passing decoding. Decoding can include at least one of iteration of processing of a channel code by the variable nodes and the observation nodes, global iteration of message passing between the observation nodes and the function nodes, and the variable nodes, and local iteration of processing by the variable nodes.

Figure 16:
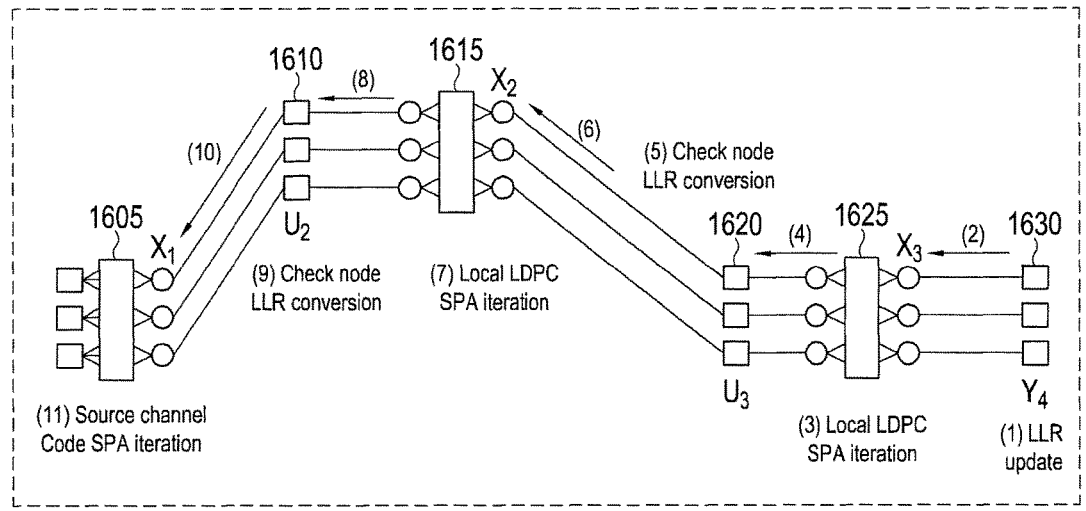
FIG. 16 illustrates a message-passing scheduling procedure in a destination node in a multi-hop network according to an embodiment of the present disclosure.

FIG. 16 illustrates a message-passing scheduling procedure in a destination node in a multi-hop network according to an embodiment of the present disclosure, in which message passing in the line network illustrated in FIG. 14 is illustrated.

Referring to FIG. 16, the destination node 1420 stores LLR values of the received signal $Y_4$ in observation nodes 1630 in operation (1) and passes the LLR values stored in the observation nodes 1630 to variable nodes 1625 for channel coding of the second relay node 1415 in operation (2). The variable nodes 1625 generate and store LLR values for the transmission signal $X_3$ of the second relay node 1415 based on the LLR values, and perform local LDPC SPA iteration with respect to the LLR values of the transmission signal $X_3$, in operation (3).

The LLR values of the variable nodes 1625 are forwarded to function nodes 1620 for the second relay node 1415, such that LLR values obtained using an inverse operation of symbol-to-bit mapping are updated from the LLR values of the variable nodes 1625 in the function nodes 1620, in operation (4). The function signal is converted into LLR values in operation (5), and the LLR values of the function signal are passed to variable nodes 1615 for channel coding of the first relay node 1410 in operation (6). The variable nodes 1615 generate and store LLR values of the transmission signal $X_2$ of the first relay node 1410 based on the LLR values, and perform local LDPC SPA iteration with respect to the LLR values of the transmission signal $X_2$, in operation (7).

In operation (8), the LLR values of the variable nodes 1615 are forwarded to function nodes 1610 for the first relay node 1410, such that in the function nodes 1610, LLR values obtained using an inverse operation of symbol-to-bit mapping from the LLR values of the variable nodes 1615 are updated. The function signal is converted into the LLR values in operation (9), and the LLR values of the function signal are passed to variable nodes 1605 for channel coding of the source end 1405 in operation (10). In operation (11), the variable nodes 1605 generate and store the LLR values of the transmission signal $X_1$ of the source end 1405 based on the LLR values, and perform local LDPC SPA iteration with respect to the LLR values of the transmission signal $X_1$. When necessary, the LLR values can be updated in an inverse order from operation (11) to operation (1), and operations (1) through (11) can be repeated a predetermined number of iterations; upon completion of iteration, an information block can be finally output from the variable nodes 1605.

The multi-hop network configured as described above approximatively achieves transmission capacity required in a next-generation communication system, contributes to increasing the system capacity through relay-node-based cooperative communication, and expands coverage for a shadow area. Channel coding according to an embodiment of the present disclosure may be applied to various networks such as a wireless packet network with erasures, a Gaussian/fading network, a network with non-Gaussian noise, and the like.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for forwarding a signal for wireless multi-hop communication, the method comprising:
configuring a decoding graph corresponding to channel coding by at least one previous hop, the decoding graph comprising variable nodes for each channel encoder of the at least one previous hop, function nodes for calculating symbols of a function signal, and observation nodes for detecting a received signal;
partially decoding, by a relay node, the received signal comprising at least one previous-hop transmission signal according to the decoding graph to obtain the function signal corresponding to the at least one previous-hop transmission signal; and
encoding, by the relay node, the function signal to for transmission to a next hop.

2. The method of claim 1,
wherein, in the decoding graph, the variable nodes are updated by the observation nodes, the function nodes are updated by the variable nodes, and the variable nodes are updated by the function nodes.

3. The method of claim 1, wherein partially decoding the received signal comprises:
storing log likelihood ratio (LLR) values of the received signal in observation nodes;
obtaining bit LLR values of a transmission signal for at least one previous hop based on the LLR values stored in the observation nodes and storing the bit LLR values in at least one variable node set corresponding to the respective at least one previous hop;
calculating LLR values of a function signal according to the decoder graph by using the bit LLR values of the transmission signal stored in the at least one variable node set and storing the LLR values of the function signal in function nodes;
updating the at least one variable node set based on the LLR values stored in the function nodes;
iterating operations according to a given iteration condition to update the observation nodes, the at least one variable node set, and the function nodes; and
outputting the LLR values of the function signal stored in the function nodes if the given iteration condition is satisfied.

4. The method of claim 3, wherein partially decoding the received signal further comprises iterating decoding of the bit LLR values of the transmission signal stored in the at least one variable node set.

5. The method of claim 1, wherein the function signal is defined by quantization of a linear function of the at least one previous-hop transmission signal.

6. The method of claim 1, further comprising:
mapping symbols of the function signal to bits according to a predetermined mapping rule; and
hashing the mapped bits according to a hashing matrix defined by a target data rate before encoding the mapped bits.

7. The method of claim 6, further comprising interleaving the mapped bits before hashing the mapped bits.

8. The method of claim 1, wherein the decoding graph is determined based on a required target data rate of a network.

9. A relay node apparatus for forwarding a signal for wireless multi-hop communication, the relay node apparatus comprising:
a decoder configured to perform partial decoding on a received signal comprising at least one previous-hop transmission signal according to a decoding graph to obtain a function signal corresponding to the at least one previous-hop transmission signal, wherein the decoding graph corresponds to channel coding by at least one previous hop and comprises variable nodes for each channel encoder of the at least one previous hop, function nodes for calculating symbols of the function signal, and observation nodes for detecting the received signal; and
a channel encoder configured to encode the function signal and to transmit the encoded function signal to a next hop.

10. The relay node apparatus of claim 9,
wherein, in the decoding graph, the variable nodes are updated by the observation nodes, the function nodes are updated by the variable nodes, and the variable nodes are updated by the function nodes.

11. The relay node apparatus of claim 9, wherein the decoder is configured to:
- store log likelihood ratio (LLR) values of the received signal in observation nodes;
- obtain bit LLR values of a transmission signal for at least one previous hop based on the LLR values stored in the observation nodes and stores the bit LLR values in at least one variable node set corresponding to the respective at least one previous hop;
- calculate LLR values of a function signal according to the decoder graph by using the bit LLR values of the transmission signal stored in the at least one variable node set and stores the LLR values of the function signal in function nodes;
- update the at least one variable node set based on the LLR values stored in the function nodes;
- iterate operations according to a given iteration condition to update the observation nodes, the at least one variable node set, and the function nodes; and
- output the LLR values of the function signal stored in the function nodes if the given iteration condition is satisfied.

12. The relay node apparatus of claim 11, wherein the decoder is configured to iterate decoding of the bit LLR values of the transmission signal stored in the at least one variable node set.

13. The relay node apparatus of claim 9, wherein the function signal is defined by quantization of a linear function of the at least one previous-hop transmission signal.

14. The relay node apparatus of claim 9, further comprising:
- a mapper configured to map symbols of the function signal to bits according to a predetermined mapping rule; and
- a hashing unit configured to hash the mapped bits according to a hashing matrix defined by a target data rate before encoding the mapped bits.

15. The relay node apparatus of claim 14, further comprising an interleaver configured to interleave the mapped bits before hashing the mapped bits.

16. The relay node apparatus of claim 9, wherein the decoding graph is determined based on a required target data rate of a network.

* * * * *